United States Patent [19]
Fang

[11] Patent Number: 5,481,561
[45] Date of Patent: Jan. 2, 1996

[54] FULLY MESHED CDMA NETWORK FOR PERSONAL COMMUNICATIONS TERMINALS

[75] Inventor: Russell J. Fang, Potomac, Md.

[73] Assignee: Comsat Corporation, Bethesda, Md.

[21] Appl. No.: 141,721

[22] Filed: Oct. 26, 1993

Related U.S. Application Data

[63] Continuation of Ser. No. 706,830, May 29, 1991, abandoned.

[51] Int. Cl.$^6$ .............................. H04J 13/02; H04J 13/04; H04B 1/69; H04B 1/707
[52] U.S. Cl. ..................... 375/205; 375/200; 375/206; 380/18; 380/30; 380/34; 380/49; 455/67.4
[58] Field of Search .................................. 375/1, 76, 97, 375/98, 200–210, 317, 344, 345; 380/18, 30, 34, 49; 370/110.1, 111; 455/9, 67, 4, 69, 70, 71

[56] References Cited

U.S. PATENT DOCUMENTS

| | | | |
|---|---|---|---|
| 4,140,973 | 2/1979 | Stevens | 455/67.4 X |
| 4,630,283 | 12/1986 | Schiff | 375/1 |
| 4,637,064 | 1/1987 | Roberts et al. | 455/67.4 |
| 4,962,507 | 10/1990 | Renshaw | 375/1 |
| 5,093,923 | 3/1992 | Leslie | 455/9 |
| 5,109,390 | 4/1992 | Gilhousen et al. | 375/1 |

FOREIGN PATENT DOCUMENTS

| | | | |
|---|---|---|---|
| 0079612A1 | 5/1983 | European Pat. Off. | H04B 7/15 |
| 0154338A3 | 9/1985 | European Pat. Off. | H04B 7/005 |

OTHER PUBLICATIONS

Supplementary European Search Report EP 92 91 3830, Communication Dated 26 Jan. 1994.

*Primary Examiner*—Bernarr E. Gregory
*Attorney, Agent, or Firm*—Sughrue, Mion, Zinn, Macpeak & Seas

[57] ABSTRACT

A network of personal communications terminals communicating in a CDMA mode includes a reference station for transmitting a pilot tone that is pre-corrected at the reference station and is used at the remaining stations for frequency control, transmit power control and antenna acquisition and tracking. Voice activation is employed to permit the CDMA system to share the satellite transponder power and bandwidth in a fully Demand-Assignment-Multiple-Accessing (DAMA) manner. Burst-mode operation of a voice activated CDMA system is permitted by sending dummy data in the speech pausing period at a reduced (but not zero) power level, and the "near-far" problem inherent in a CDMA system is mitigated by the use of uplink power control.

14 Claims, 9 Drawing Sheets

PICO TERMINAL NETWORK CONCEPT

PICO TERMINAL NETWORK CONCEPT

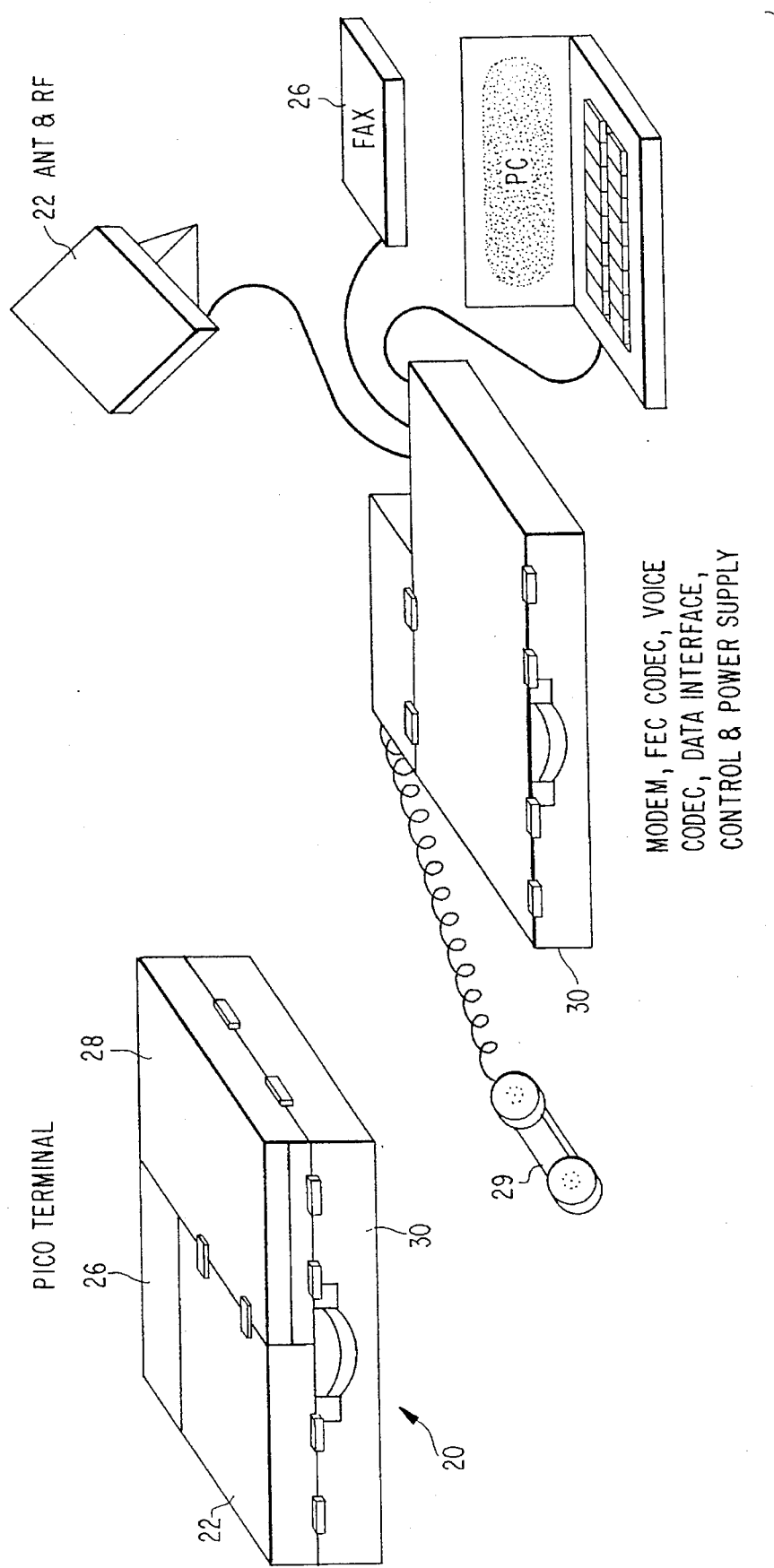

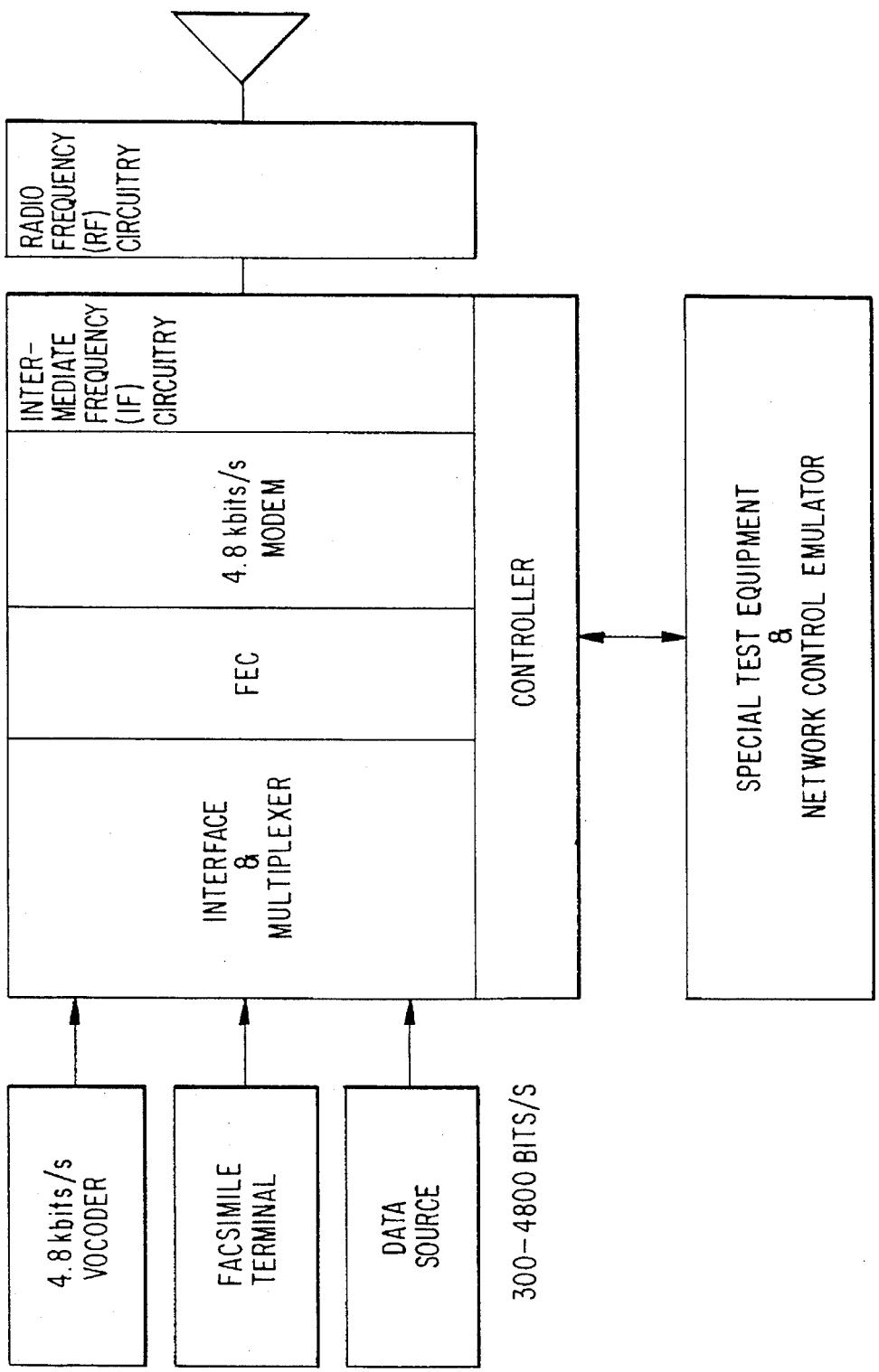

FIG. 5A  PREAMBLE WITHOUT SPREAD SPECTRUM
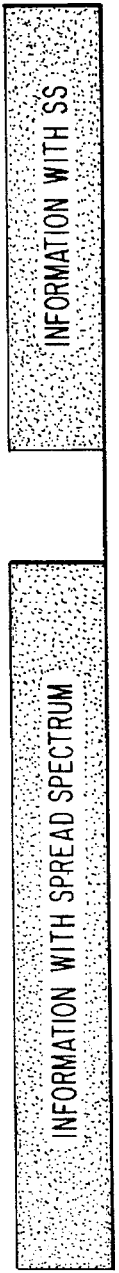
FIG. 5B  PREAMBLELESS BURST MODE SPREAD SPECTRUM SIGNAL
FIG. 5C  DE-FACTO BURST MODE TRANSMISSION OF CONTINUOUS MODE SPREAD SPECTRUM SIGNAL. (SPREAD SPECTRUM ON BOTH PREAMBLE AND INFORMATION PARTS)
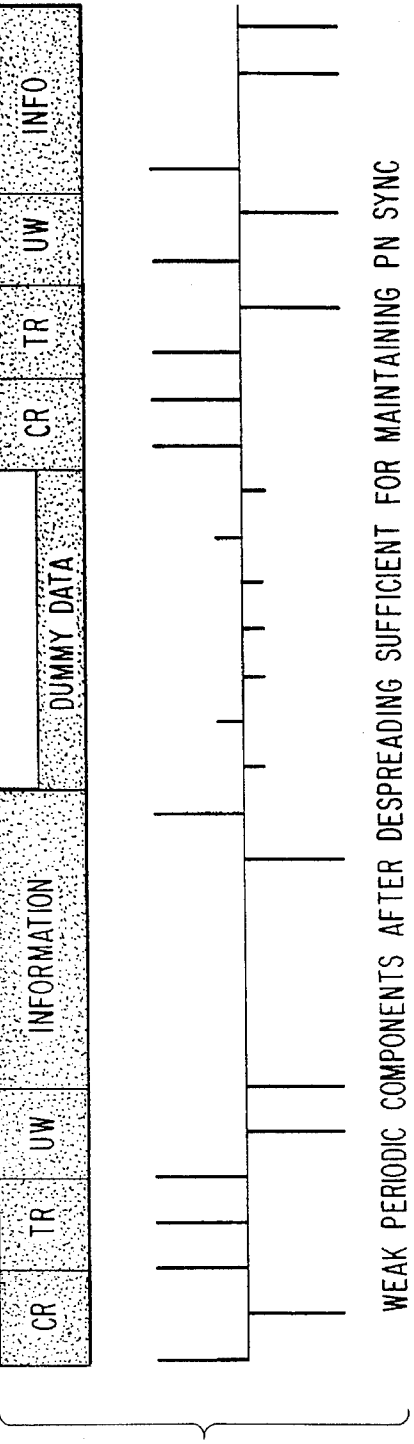
FIG. 5D  WEAK PERIODIC COMPONENTS AFTER DESPREADING SUFFICIENT FOR MAINTAINING PN SYNC UPLINK CW TONE PRECORRECTED FOR FREQUENCY ERROR OF -D Hz TOTAL DOWNLINK CW TONE AT DESIRED FREQUENCY $F_o'$

FULLY MESHED CDMA NETWORK FOR PERSONAL COMMUNICATIONS TERMINALS

This is a continuation of application No. 07/706,830 filed May 29, 1991, now abandoned.

BACKGROUND OF THE INVENTION

The present invention is directed to a communications network, and more particularly to a fully meshed network of personal communications terminals.

As a communications medium, satellite has the unique capability of providing multipoint-to-point (multiple access) and point-to-multipoint (broadcast) mode communications simultaneously, thereby permitting multipoint-to-multipoint communications by small users. However, current satellite systems designed for small users are limited in network topology as well as applications. For example, VSAT (very small aperture terminal) data networks and satellite mobile networks (e.g., INMARSAT) are all limited to star network topology where small users are communicating into a large hub or gateway station. Any communications between remote small users must be relayed by the central hub or gateway station, and hence results in a double-hop mode of transmission over the satellite transponders. While double-hop long delay might be marginally acceptable to some low speed data transmission, it is totally unacceptable for two-way voice communications. Therefore, the present VSAT as well as INMARSAT mobile networks are not suitable for communications between small users.

Code Division Multiple Access (CDMA) is a spread spectrum communications technique whereby multiple stations communicate with one another over a common link, with each station being assigned a unique PN code to be used in "spreading" the bandwidth of signals destined for that station from other stations. Each station receives all signals over the link, and looks for correlation with its respective unique PN code. Signals "spread" with a station's unique PN code will exhibit a high correlation and can therefore be "de-spread" using the same code.

CDMA is advantageous in that it uses available bandwidth efficiently, but the very concept of spread spectrum communications requires avoidance of signals with high periodicity, e.g., synchronizing signals. Thus, elaborate measures must be taken to ensure synchronization between the various stations on the network, and the cost of the system becomes very high. For this and other reasons, CDMA has been limited to use in star network topologies where synchronization is easiest, such as Omnitrack, Qualcomm digital cellular mobile, and Equatorial systems. There are no applications of this technology to a "fully-meshed" network topology, i.e., where there is a direct connection path from any node on the network to any other node on the network.

In addition, small user communications networks typically involve significant intermittent communications, and efficient utilization of bandwidth would dictate that the bandwidth be allocated on a demand assigned basis and used in a "burst" mode. However, using burst mode communications has conventionally required that synchronization be acquired very rapidly at the beginning of each burst, but this is impractical in a spread spectrum system where the transmission of highly periodic signals for synchronization purposes is to be avoided.

Accordingly, it is an object of the present invention to provide a fully meshed network of small personal communications terminals.

SUMMARY OF THE INVENTION

In accordance with the present invention, CDMA communications are employed for direct communications between small users in a fully-meshed network, thereby avoiding the double-hop which is characteristic of star network topologies. Voice activation is employed to permit the CDMA system to share the satellite transponder power and bandwidth in a fully Demand-Assignment-Multiple-Accessing (DAMA) manner. Frequency error and phase noise problems, common in low data rate transmission systems, are minimized by using a stable and frequency pre-corrected tone. The "near-far" problem inherent in a CDMA system is mitigated by the use of uplink power control. The difficult problem of burst-mode operation of a voice activated CDMA system is solved by sending dummy data in the speech pausing period at a reduced (but not zero) power level. To speed up the call set-up process, simple schemes are employed, thereby long call set-up delay is avoided. In addition, a simple billing system is proposed which employs a metering concept whose reading can be polled during off peak hours.

BRIEF DESCRIPTION OF THE DRAWINGS

The invention will be more clearly understood with reference to the following description in conjunction with the accompanying drawings, wherein:

FIGS. 2A, 2B and 2D are illustrations of various components of a personal communications terminal according to the present invention, with FIG. 2C showing a conceptual block diagram of a terminal;

FIGS. 5A–5D are diagrams for explaining the reduced power level transmission during pauses between speech;

DETAILED DESCRIPTION OF THE INVENTION

Figure 1:
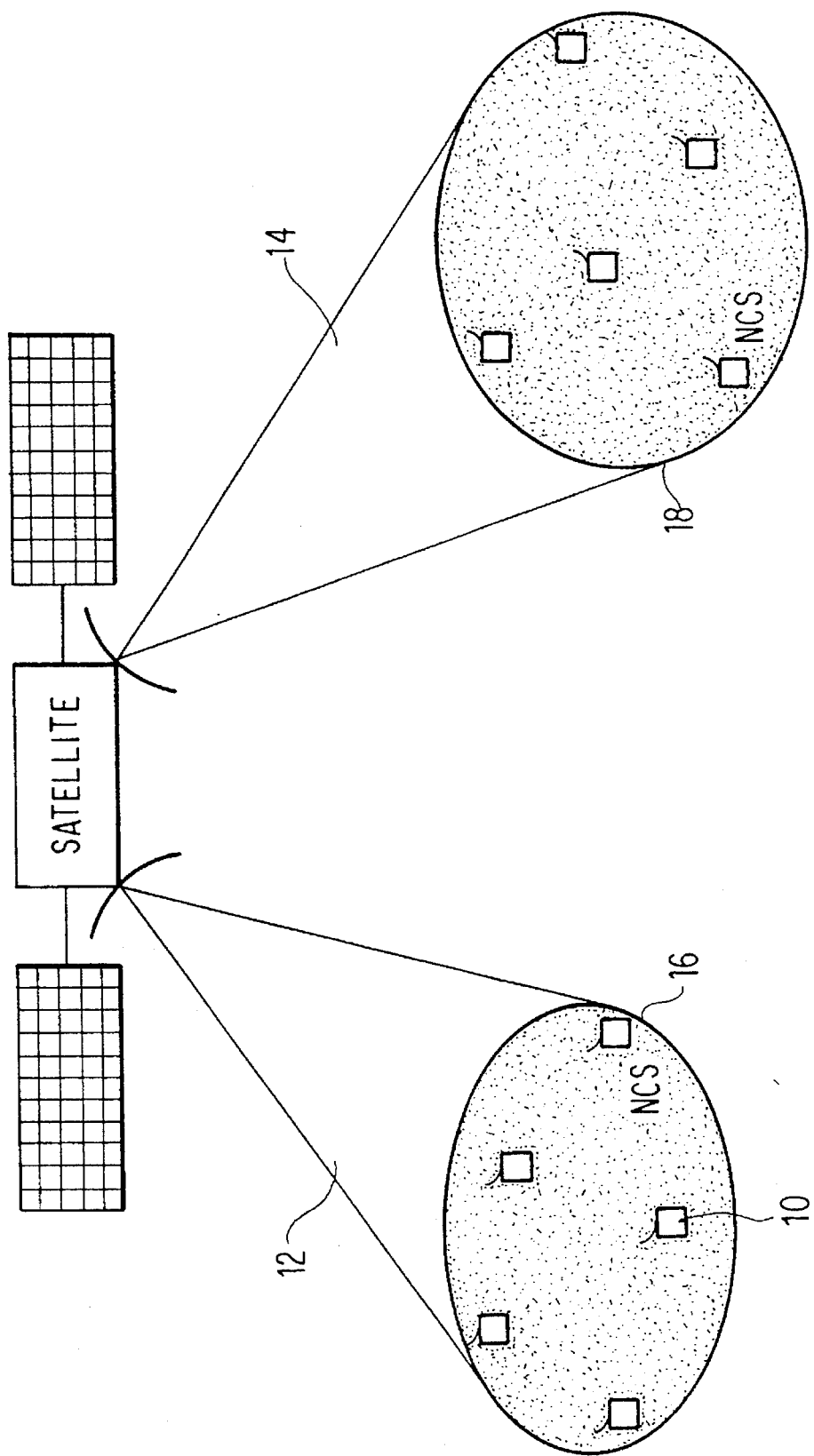
FIG. 1 is an illustration of the concept of a personal communications terminal network according to the present invention.

The invention will now be described, with reference first to FIG. 1. In the description which follows, the term "pico terminal" will be used to refer to a personal communications terminal. For ease of explanation, it is assumed that all pico terminals 10 are in the same uplink and downlink foot prints of the satellite coverage, e.g., at Ku band, as illustrated in FIG. 1 where the uplink beam is designated by 12 and the downlink beam by 14. Each terminal 10 is given a unique PN code for receiving signals destined for that terminal. Thus, if Terminal A wishes to communicate with Terminal B, it uses Terminal B's PN code to "spread-spectrum" modulate the information bit stream and transmit to Terminal B over the satellite transponder.

With reference now to FIGS. 2A and 2B, a basic pico terminal at Ku-band can be packaged into a suitcase 20, suitable for transportation. A suitcase or other package that can be readily carried will be referred to in the claims hereafter to be "portable". It may include: a 1.2 m $K_u$-band antenna 22 at 14/11 GHz with automatic tracking, a telephone handset 24, a Group-3 Fax machine 26, and a laptop or desktop personal computer (PC) 28. Within the lower part 30 of the carrying case would be housed a 4.0 W solid-state power amplifier (SSPA), a low noise amplifier (LNA) of 2.5 dB noise figure, a spread-spectrum binary phase-shift-keying (BPSK) modem, a rate ⅔ Viterbi codec with 4.4 dB coding gain at a bit error rate $BER=10^{-5}$, a 4.8 Kbit/s code-excited-linear predictive (CELP) voice codec, data ports at 1.2, 2.4, and 4.8 Kbit/s, a Group-3 Fax interface, a statistical multiplexer of voice and data, and a CDMA and network controller.

The particular types of components used would of course be selected in accordance with desires for packaging, price and performance. For example, the antenna 22 could be a flat plate antenna.

FIG. 2C illustrates a block diagram of various components in the pico terminal, with each of the components designated by an appropriate descriptive label.

Figure 2D:
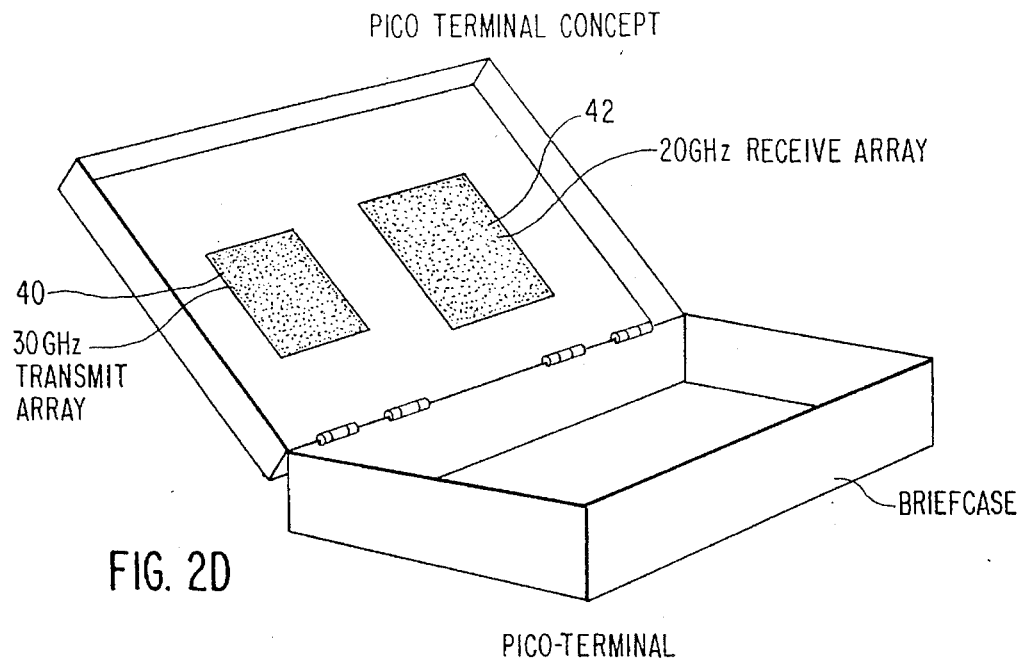

FIG. 2D illustrates an alternative implementation wherein 30 Ghz transmit and 20 Ghz receive arrays 40 and 42, respectively, would be located in the hinged lid of a briefcase 44.

The transponder is accessed by the pico terminals in a code-division manner, or CDMA (code-division-multiple-access). Data and facsimile can be statistically multiplexed into the pausing period of the voice speech spurts. Calls (voice, data, and facsimile) are made directly to the destination terminal, and message units in terms of bits, bytes, or packets are recorded at both transmit and receive terminals for polling during off peak hours for billing and bookkeeping purposes. Alternatively, credit units can be preloaded or preauthorized into each terminal. Usage can be debited from these credit units, or they can be settled by a third party clearinghouse, if so desired.

Call set-up and take-down operations will now be described. Recall that the space segment resources are accessed by means of CDMA. Each pico terminal has its unique PN code for reception, and all transmissions from Terminal A to Terminal B require the use of Terminal B's PN code during spread spectrum modulation at the transmitting Terminal A. Thus, each terminal has a programmable PN generator that is capable of generating the PN code of the destination terminal for spread spectrum transmission.

Figure 3A:
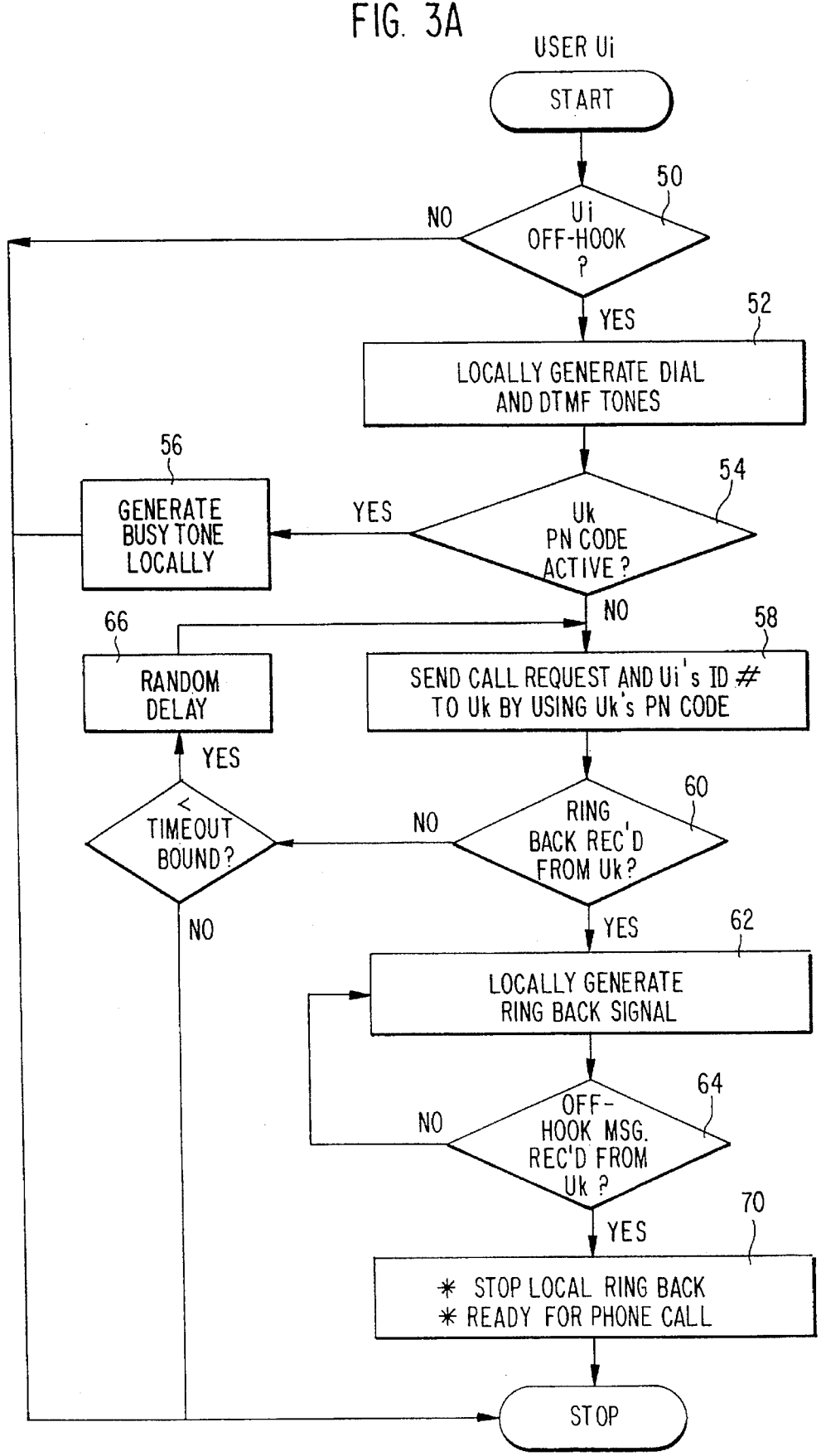
FIGS. 3A and 3B are flow charts of the call setup procedure at a calling and called terminal, respectively.
Figure 3B:
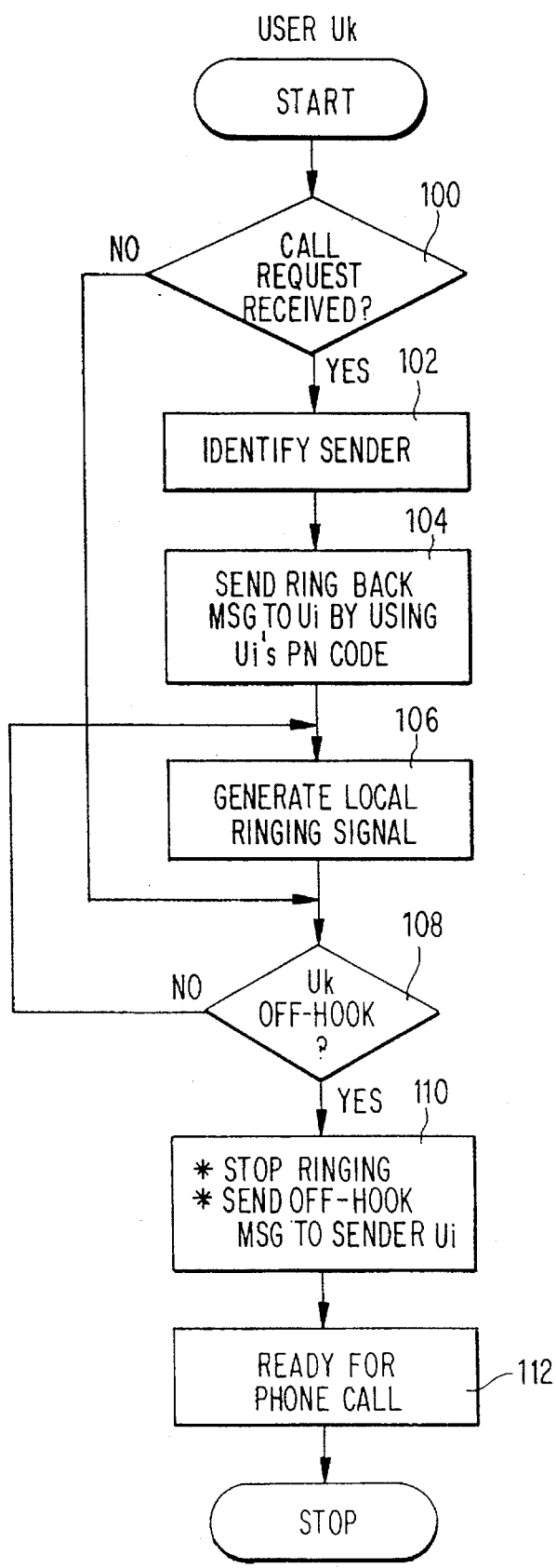

FIGS. 3A and 3B illustrate a flow chart of the call set-up procedure for a call from user Ui to user Uk, with FIG. 3A reflecting the operation at the calling terminal and FIG. 3B reflecting the operation at the called terminal. As long as the user Ui leaves the handset on-hook, this is detected at step 50 in FIG. 3B, and no action is taken. As soon as it is detected at step 50 that the user Ui has taken the handset off-hook, idle and dial tones are locally generated at step 52. User Ui then dials the number of the destination terminal Uk, and the user Ui equipment then knows (e.g., by retrieval from a look-up table) the PN code uniquely assigned to the destination terminal Uk. The user Ui equipment then listens at step 54 using the destination terminal's PN code to decide whether anyone else is using that code to communicate with the destination terminal (in this case terminal Uk).

If some one is already using the code for terminal Uk, no call request message will be sent, but instead a busy tone will be locally generated at step 56 to indicate to user Ui that terminal Uk is busy. If no one is using the PN code assigned to terminal Uk, then the calling terminal can proceed at step 58 to send a call request message spread spectrum modulated with the PN code of the destination terminal.

At the destination terminal Uk, the reception of a call request will be detected at step 100 in FIG. 3B. The terminal Ui ID code contained within the call request will be detected at step 102, and an answer-back message will be sent to the calling terminal Ui at step 104. At this point, a local ringing signal will be generated at the terminal Uk in step 106 to let the operator know that a call is being received.

The reception of the answer-back message by the calling terminal Ui will be detected at step 60 in FIG. 3A. This will be followed by a locally generated ringing signal at step 62 to let the operator know at terminal Ui that the terminal Uk equipment is ringing. If no answerback is received within some set period, detected at step 64 in FIG. 3A, it is assumed that the terminal Uk is unattended, and after a random delay at step 66, the call request signal is resent.

As soon as it is determined at step 108 in FIG. 3B that the hand set has been picked up at the destination terminal, an off-hook message is generated at step 110 and is sent back to the calling party. The called terminal Ui then proceeds to step 112 where it is prepared for a full duplex telephone conversation. With the arrival of the off-hook message detected at step 68, the calling terminal stops its answer-back rings at step 70 and prepares for full duplex telephone conversation.

Figure 4:
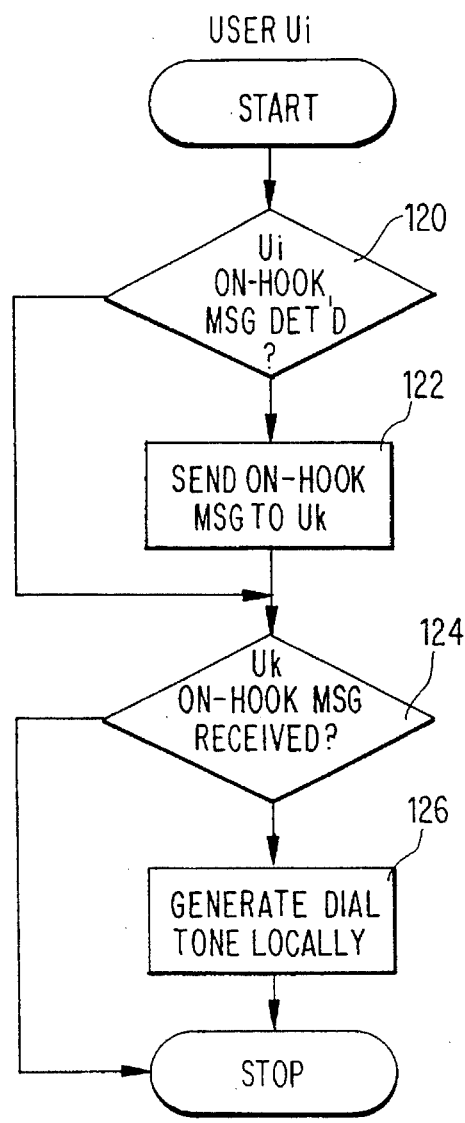
FIG. 4 is a flow chart of a call take down procedure at a terminal on the network of the present invention.

A call take-down procedure is illustrated in FIG. 4. When either party hangs up, an on-hook message is sent to the other party. If terminal Ui detects at step 120 that it is now on-hook, an on-hook message is sent to terminal Uk at step 122. Whether the test at step 120 is affirmative or negative, the terminal checks at step 124 for an on-hook message from terminal Uk. If such an on-hook message is received, terminal Ui generates a local idle tone. The procedure at terminal Uk and all other terminals will be essentially the same.

It will be easily seen that all terminals share a common power and bandwidth and power resource, transmitting when they need to and using some of the available bandwidth, and then leaving the bandwidth and power to the other users when not participating in a call. As is also known, however, even when a call is in progress there is a substantial amount of inactive time, e.g., pauses between speech. Most efficient use of the available resources is obtained by activity-activated burst-mode communications. Burst-mode CDMA transmission, which is a natural consequence of carrier activation in accordance with the activity of voice, data, and facsimile, is difficult to realize in practice. As shown in FIG. 5A, one option would be to send a preamble which is not subjected to spread spectrum modulation, to enable fast acquisition at the beginning of each burst. However, a fixed pattern preamble in a typical burst structure could severely impact the auto- and cross- correlation performance of the PN code. FIG. 5B illustrates an alternative whereby no preamble is used, but fast acquisition of PN code synchronization for preambleless bursts with spread spectrum is extremely difficult to achieve.

The present invention overcomes this problem by inserting dummy data into the pausing periods of the speech spurts, and the corresponding spread spectrum signal is transmitted at a reduced level by a factor of K, e.g., 15–20 dB, as shown in FIG. 5C. The reduced power level should be sufficient to ensure that the clock and code synchronization can be maintained, and the transponder power usage will be negligible. FIG. 5D illustrates the power level of the various portions of the signal after despreading, and it can be seen that the power level of the dummy data transmission is reduced but is still sufficient to maintain PN synchronization. Thus, the transponder power (as well as bandwidth) is effectively shared amongst the voice/data/facsimile activated CDMA bursts.

Figure 7:
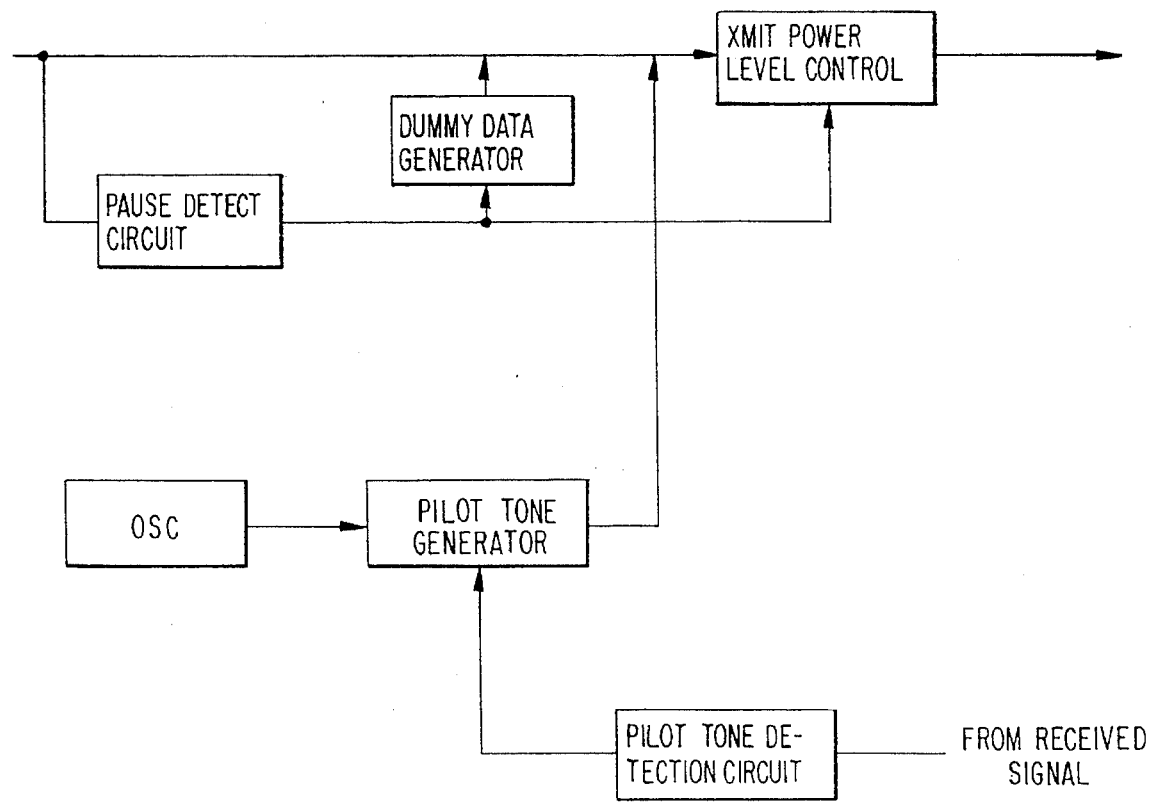
FIG. 7 is a brief block diagram for explaining the reduced power level transmission and pilot signal control features of the present invention.

The circuitry necessary to implement this function is straightforward, and need not be described in detail herein, requiring essentially a pause detector as shown in FIG. 7, with the output of the pause detector being provided to control dummy data insertion and transmit power level.

There are preferably two Network Control Stations (NCS's) for each beam, one being a primary and the other being a diversity station. These are designated, for example, by reference numbers 16 and 18 in FIG. 1. They may in fact be located physically together but electrically separate. However, it may in some cases be advantageous to have the two NCS's located in different geographical areas so that control could be switched from one to the other if the effectiveness of the primary NCS becomes adversely affected by local inclement weather.

The primary functions of these NCS's are to maintain accurate frequency control and to conduct the polling necessary to determine charges to various users. The latter function is in connection with the feature of the invention, described above, whereby message units are recorded at the transmit terminal, and optionally both the transmit and receive terminals, with the recorded data then being polled during off-peak hours. If a preloaded or preauthorized credit scheme is used, the adding to the credit could be done remotely from the NCS. The former function, i.e., frequency control, will be described below.

Figure 6A:
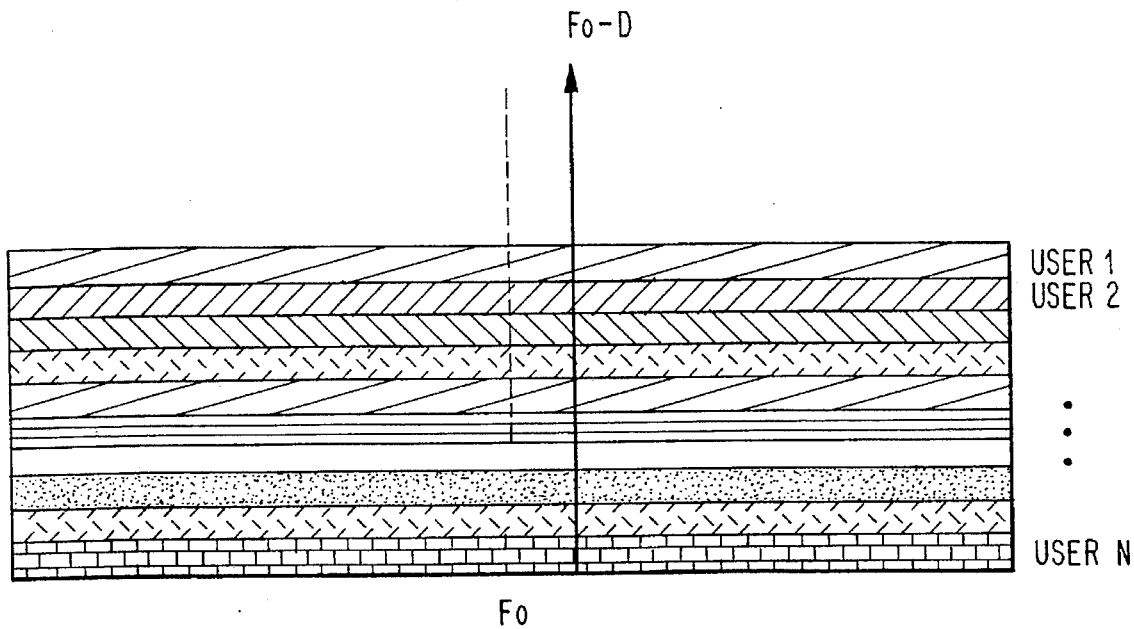
FIGS. 6A and 6B are diagrams for explaining the pilot frequency precorrection feature of the present invention.
Figure 6B:
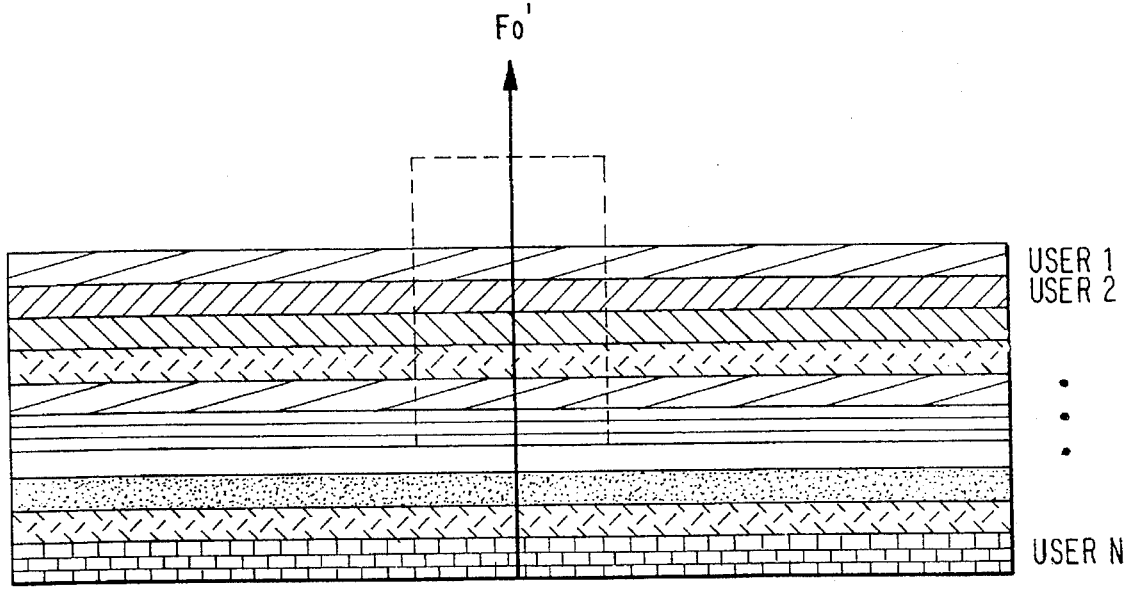

It will be appreciated that in a fully-meshed CDMA network it is important to maintain careful control of the frequencies of the carriers generated at the various terminals. A solution would be to have very high precision oscillators at each terminal, but this is inconsistent with the concept of a low cost personal communications terminal. The present invention provides an alternative solution. More particularly, the NCS employs a high precision oscillator, e.g., with long term instability better than 1 part in $10^{-8}$. The NCS sends a CW (continuous wave) pilot to each beam, and then watches for the tone to be returned. The NCS then corrects for frequency errors (e.g., caused by frequency translation on board the satellite and by satellite Doppler shifts) by observing its own transmissions and adjusting the frequency of the pilot tone so that the received CW pilot is at a precise desired frequency as illustrated in FIGS. 6A and 6B, e.g., the NCS adjusts the frequency of the transmitted pilot tone to $F_0+D$ to compensate for a frequency error of $-D$ and thereby obtain a received pilot tone at the desired frequency of $F_0$ in the center of the downlink frequency band. The circuitry necessary to implement this function is straightforward and needs no detailed description herein, essentially comprising a high precision oscillator, pilot tone generator and a pilot tone detector for monitoring the frequency and amplitude of the received pilot tone signal, as shown in FIG. 7.

This precorrected pilot is then employed by other pico terminal antennas for satellite acquisition and tracking. I.e., since this known tone will be transmitted, each pico terminal may have a circuit for detecting this frequency and, by monitoring the strength of the received signal, determine when the pico terminal antenna is properly directed to the satellite.

Further, the pilot can be tracked by means of a PLL (phase-locked-loop) at the non-NCS pico terminals, which have much less stable and hence less costly oscillators, and the tracked pilot can be used as their frequency source.

Finally, the level of this pilot tone is also precalibrated at the NCS so that it can be employed by other pico terminals as one of the references for their uplink power control, which is necessary to mitigate the inherent "near-far" problem of CDMA systems and also needed for combatting uplink signal fade. More particularly, the NCS will maintain a predetermined power level for the pilot tone transmission, and the other pico terminals will monitor the received amplitude. If the received amplitude falls below some predetermined level, the detecting terminal will assume that the attenuation is due to fade in the path of the downlink beam, and the detecting terminal will then know that it should increase its own transmission power to offset this fade. This monitoring and increasing operation performed at the receiving terminal can of course be either automatically or manually performed.

The power level control at each pico terminal is preferably limited. For example, if an attenuation of 10 dB is excessive, the pico terminal may be provided with a 5 dB adjustment capability.

Communications privacy and conditional access can be secured by incorporating encryption means. In fact, it is quite simple to superimpose a centralized subnetwork on top of this basic mesh network for access control, user authentication, and key and PN code distribution. It should be noted that spread spectrum itself does not provide the needed communications privacy within the personal communications network, although it does to some extent as far as the external listeners are concerned.

It will be appreciated that various options are available for providing secure transmissions in the pico CDMA network. As but one example, a system administrator could periodically change the assigned PN codes, e.g., on a monthly basis. Further, each terminal may have several PN codes in use alternatively or simultaneously. If simultaneous use of plural PN codes is provided for, a given terminal may have its own unique PN code used in the manner described above and may also have one or more additional codes assigned to groups to which the terminal belongs.

Further, it would be possible for the CDMA network to operate as a public key cryptosystem, by simply using the public key for each terminal as the PN code assigned to that terminal for the spread spectrum communications.

The pico terminals in the network of the present invention can provide voice, data, and facsimile communications amongst themselves in a single-hop fully-meshed manner without experiencing objectionable long delays caused by the use of double-hops via satellite. There are numerous potential applications of such a meshed network, including: single-channel voice, Group 3 facsimile, radio dispatch (voice and alphanumeric), paging and broadcast data, electronic messages, distress and emergency messages, database query/response, polling and data collection, transactional data, data transfer and private data network.

In order to minimize the costs to these pico terminals, a PSTN (Public Switched Telephone Network) interface may be omitted from an elementary system, together with the protocol conversion for interface with public data networks, although these can be provided if desired in an enhanced version.

With CDMA, not only are the satellite transponder bandwidth and power resources shared on-demand by all spread spectrum carriers, but also voice and data activity compression gains are realized. Moreover, voice communication between any two pico terminals is now achieved via a single satellite hop, not via the unacceptable double hops in all VSAT or INMARSAT/AUSAT/AMSC/TMI satellite mobile systems. Since any pico terminal in the network can communicate with any other pico terminal in a single hop, a fully meshed network is thus realized. Furthermore, the NCS can be made very simple and no complicated hub or gateway stations are necessary.

It will be appreciated that various changes and modifications could be made to the system disclosed above without departing from the spirit and scope of the invention as defined in the appended claims. For example, the spread factor could be adjustable, with the spreading PN code long enough to accommodate a certain number of users at the outset, and then lengthened to accommodate more users later. Also, the signals could be converted to baseband at the receivers before the despreading operation is performed. Still further, there could be a PBX at the transmitting or receiving end, with the PN codes assigned to the terminals connected to the PBX.

Figure 8:
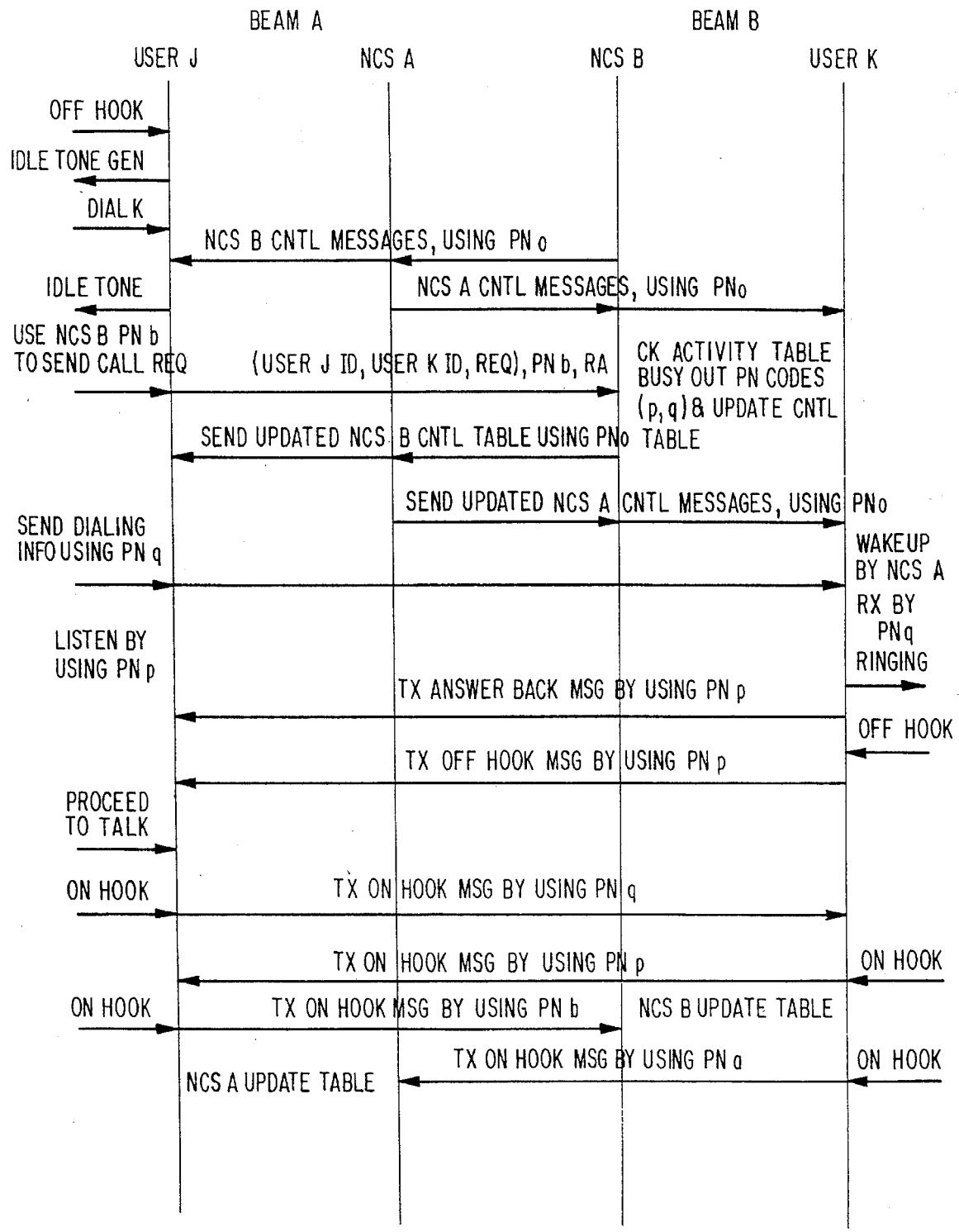
FIG. 8 is a diagram for explaining call set-up and take-down for a multibeam satellite system.

There could also be dynamic assignment of codes, e.g., session codes, if advantageous in any particular application. For example, with reference to FIG. 8, in a multibeam system wherein user J and NCS A are in the same beam but cannot see one another's transmissions, the NCS's A and B would send control information using a common PN, e.g., $PN_0$. NCS B in beam B would send to NCS A and to user J in beam A a control message, e.g., containing a table of the calls in progress and the PN codes currently assigned, and NCS A would send a corresponding control message to NCS B and to user K in beam B. When a call to user K is desired, user J would send the request to NCS B using the PN code b, and then NCS B (and later NCS A) would send out an updated control table including the p and q codes assigned for this call. User J would then call user K using the assigned PN code q, user K would answer using the assigned PN code p, and the call would proceed as described earlier herein, at the end of which users J and K would send their respective on-hook signals to NCS B and NCS A using the PN codes b and a, respectively, and the control table would be updated.

It should also be noted that the described sequence of operations involves the use of the destination PN code for spreading and despreading, but in a further modification it would be possible to use the PN code of the transmitting terminal. For example, the PN code of the receiving terminal could be used to send to the receiving terminal a notification that a call is to be set up, while also identifying the transmitting terminal, and the receiving terminal could then load the transmitting terminal PN code and this could be used for the remainder of the call.

What is claimed is:

1. A communications system, comprising a plurality of terminals communicating with one another in a code division multiple access (CDMA) manner over a communications medium, said system including a modulator at each of said terminals for modulating signals being transmitted to another terminal in accordance with a PN code associated with communications between said each terminal and said another terminal, and a demodulator at said another terminal for demodulating received signals in accordance with said PN code, said system further comprising reference means at at least one of said plural terminals for transmitting a pilot tone to others of said terminals for controlling at least one parameter at said other terminals, and means at said other terminals for receiving said pilot tone and controlling said at least one parameter in accordance with said pilot tone, said system further comprising means for automatically periodically changing said PN codes associated with said terminals.

2. A system as defined in claim 1, further comprising means for assigning said PN codes on a demand assigned basis.

3. A communications system, comprising a plurality of terminals communicating with one another in a code division multiple access (CDMA) manner over a communications medium, said system including a modulator at each of said terminals for modulating signals being transmitted to another terminal in accordance with a PN code associated with communications between said each terminal and said another terminal, and a demodulator at said another terminal for demodulating received signals in accordance with said PN code, said system further comprising reference means at at least one of said plural terminals for transmitting a pilot tone to others of said terminals for controlling at least one parameter at said other terminals, and means at said other terminals for receiving said pilot tone and controlling said at least one parameter in accordance with said pilot tone, said system further comprising means for determining said PN codes in accordance with a public key cryptosystem.

4. A communications system, comprising a plurality of terminals communicating with one another over a communications medium, said system including a modulator at each of said terminals for modulating signals to be transmitted to a particular one of said terminals in accordance with a PN code assigned to communications between said each terminal and said particular terminal, and a demodulator at said particular terminal for demodulating signals in accordance with said PN code, with each terminal transmitting information separated by pauses, with each terminal transmitting other signals during said pauses in the transmission of said information, and wherein each terminal transmits at a lower power level during said pauses than during transmission of said information.

5. A communications system, comprising a plurality of terminals communicating with one another over a communications medium, said system including a modulator at each of said terminals for modulating signals being transmitted over said communications medium and a demodulator for demodulating signals received over said communications medium, said system further comprising:

reference means at at least one of said plural terminals for transmitting a pilot tone to others of said terminals for controlling at least one parameter at said other terminals;

means at said other terminals for receiving said pilot tone and controlling said at least one parameter in accordance with said pilot tone;

means at each of said terminals for storing data relating to the amount of information transmitted; and means for polling each terminal to retrieve said stored data for billing purposes.

6. A communications system, comprising a plurality of terminals communicating with one another over a communications medium, said system including a modulator at each of said terminals for modulating signals being transmitted over said communications medium and a demodulator for demodulating signals received over said communications medium, said system further comprising:

reference means at at least one of said plural terminals for transmitting a pilot tone to others of said terminals for controlling at least one parameter at said other terminals;

means at said other terminals for receiving said pilot tone and controlling said at least one parameter in accordance with said pilot tone;

means at each of said terminals for storing a credit value corresponding to an amount of preauthorized credit; and means at each of said terminals for subtracting from said stored credit value in accordance with an amount of information transmitted by said terminal.

7. A communications system, comprising a plurality of terminals communicating with one another over a communications medium, said system including a modulator at each of said terminals for modulating signals being transmitted over said communications medium and a demodulator for demodulating signals received over said communications medium, said system further comprising:

reference means at at least one of said plural terminals for transmitting a pilot tone to others of said terminals for controlling a pointing direction of an antenna at said other terminals; and means at said other terminals for receiving said pilot tone and controlling said antenna pointing direction in accordance with said pilot tone.

8. A system as defined in claim 7, wherein said reference means at said one terminal transmits said pilot tone onto said communications medium, and wherein said one terminal includes means for monitoring the return of said pilot tone to said one terminal, and means for adjusting the amplitude of the transmission of said pilot tone by said one terminal to obtain a desired received pilot tone amplitude, each terminal other than said one terminal including means for adjusting a transmit power level in accordance with the amplitude of said received pilot tone.

9. A system as defined in claim 7, wherein said terminals are portable.

10. A system as defined in claim 7, wherein said information includes speech information.

11. A system as defined in claim 7, wherein said information includes facsimile information.

12. A system as defined in claim 7, wherein said information includes data.

13. A communications system, comprising a plurality of terminals communicating with one another over a communications medium, said system including a modulator at each of said terminals for modulating signals being transmitted over said communications medium and a demodulator for demodulating signals received over said communications medium, said system further comprising:

reference means at at least one of said plural terminals for transmitting a pilot tone to others of said terminals for controlling a carrier frequency at said other terminals; and means at said other terminals for receiving said pilot tone and controlling said carrier frequency in accordance with said pilot tone.

14. A system as defined in claim 4, wherein said reference means at said one terminal transmits said pilot tone onto said communications medium, and wherein said one terminal includes means for monitoring the return of said pilot tone to said one terminal, and means for adjusting the frequency of transmission of said pilot tone by said one terminal to obtain a desired received pilot tone frequency.

* * * * *